United States Patent [19]

Park et al.

[11] Patent Number: 5,766,676
[45] Date of Patent: Jun. 16, 1998

[54] METHOD FOR MANUFACTURING RARE EARTH-NICKEL-METALLIC HYDRIDE ELECTRODES

[75] Inventors: Chung Neun Park, Kwangju; In Sik Choi, Anyang, both of Rep. of Korea

[73] Assignee: Gold Star Cable Co., Ltd., Seoul, Rep. of Korea

[21] Appl. No.: 387,854

[22] PCT Filed: Aug. 30, 1993

[86] PCT No.: PCT/KR93/00076

§ 371 Date: Apr. 6, 1995

§ 102(e) Date: Apr. 6, 1995

[87] PCT Pub. No.: WO94/06161

PCT Pub. Date: Mar. 17, 1994

[30] Foreign Application Priority Data

Aug. 31, 1992 [KR] Rep. of Korea ............... 1992-15827

[51] Int. Cl.$^6$ ............... B05D 5/12; B05D 1/36; B05D 1/18
[52] U.S. Cl. ............ 427/123; 427/404; 427/443.2; 205/291
[58] Field of Search ............... 427/58, 123, 404, 427/443.2; 205/74, 291; 204/106, 1.11

[56] References Cited

U.S. PATENT DOCUMENTS

| 3,650,777 | 3/1972 | Schneble, Jr. et al. ............ 106/1 |
| 4,997,729 | 3/1991 | Hatoh et al. ............ 429/40 |
| 5,128,219 | 7/1992 | Kohler et al. ............ 429/59 |
| 5,393,616 | 2/1995 | Mori et al. ............ 429/59 |

OTHER PUBLICATIONS

E. B. Saubestre, Electroless Copper Plating, 1959 pp. 264–265.

*Primary Examiner*—Shrive Beck
*Assistant Examiner*—Bret Chen
*Attorney, Agent, or Firm*—Ladas & Parry

[57] ABSTRACT

The present invention relates to a method for manufacturing a nickel-metallic hydride electrode. This invention is characterized in that rare earth-nickel-hydrogen-stored alloy powder is molded by plating it with copper without electrolysis, so that mechanical strength, electric conductivity and reaction velocity can be improved by increasing the amount of plating the surface of a molded electrode with copper.

1 Claim, 1 Drawing Sheet

METHOD FOR MANUFACTURING RARE EARTH-NICKEL-METALLIC HYDRIDE ELECTRODES

BACKGROUND OF THE INVENTION

1. Field of the Invention

The present invention relates to a nickel-metallic hydride battery. More particularly, this invention relates to a method for manufacturing a metallic hydride electrode used as the cathode.

2. Description of the Prior Art

The former method of manufacturing a metallic hydride electrode by using a rare earth-nickel hydrogen storage alloy was that it was manufactured by filling hydrogen-stored alloy powder in foam nickel and compressing it or hydrogen-storage alloy powder was manufactured in the form of an electrode by plating It with copper without electrolysis and molding it subsequently or by using an organic bonding agent.

However, the former method of manufacturing an electrode by plating alloy powder with copper without electrolysis and molding it merely was not able to achieve necessary molding and electric plating because copper plating was not so uniform that copper amounted to 15 to 25% of alloy weight.

SUMMARY OF THE INVENTION

Therefore, it is an object of the present invention to provide a method for manufacturing a rare earth-nickel-matallic hydride electrode which increases the amount of plating the surface of a molded electrode with copper by plating alloy powder with copper amounting to about 10% of alloy weight without electrolysis and molding it subsequently and again plating it with copper amounting to about 5% of alloy weight without electrolysis, thereby improving mechanical strength, electric conductivity and reaction velocity.

DETAILED DESCRIPTION OF THE INVENTION

Figure 1:
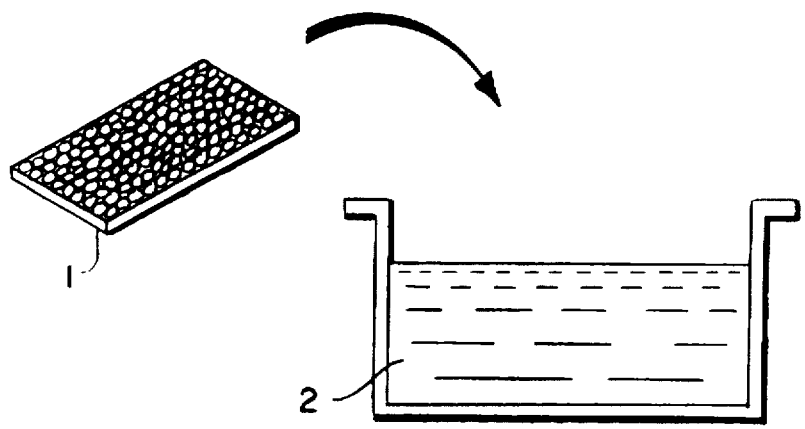
FIG. 1 is a process diagram showing the stages of soaking a metallic hydride electrode in an acid nonelectrolytic plating solution according to the present invention.

As illustrated in FIG. 1, a metallic hydride electrode 1 is manufactured by plating alloy powder with copper without electrolysis and molding it subsequently. The metallic hydride electrode 1 Is soaked in an acid-non-electrolytic copper plating solution 2 which contains a high percentage of copper and ion. The plating solution 2 is composed of 10 to 40 g of $CuSO_4 \cdot 5H_2O$, 100 g of $H_2O$ and 0.3 to 1.0 ml of $H_2SO_4$. Plating amount are determined by the ratio of the amount of Cu ion in the solution to the amount of alloy to be coated. Then, pores of the electrode is completely filled with plating solution and it is taken out.

Figure 2:
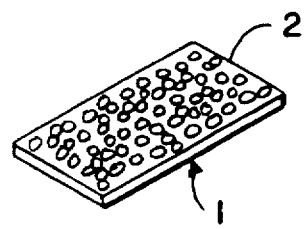
FIG. 2 is a process diagram showing the stages of maintaining a metallic hydride electrode wet in an acid nonelectrolytic plating solution in the atmosphere according to the present invention.

As illustrated in FIG. 2, the electrode 1 wet in the plating solution 2 is kept for about 3 to 5 minutes until copper plating is finished in the atmosphere while it is maintained horizontally so that the plating solution may not flow down.

Figure 3:
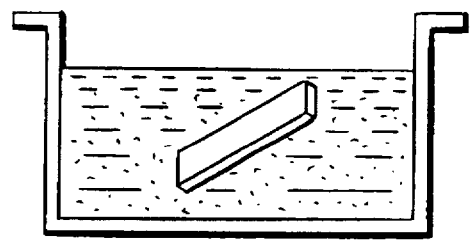
FIG. 3 is a process diagram showing the stages of washing an acid nonelectrolytic plating solution in water from an electrode plating of which is finished according to the present invention.

Thereafter, the electrode 1 is washed in water before its plating solution gets dry, as illustrated in FIG. 3.

The method of manufacturing a rare earth-nickel-metallic hydride electrode according to the present invention increases the amount of plating the surface of a molded electrode by plating alloy powder with copper amounting to about 10% of alloy weight without electrolysis and molding it subsequently and again plating a molded article with copper amounting to about 5% of alloy weight, thereby improving mechanical strength and reaction velocity, as compared with the former method of using foam nickel or plating it with copper without electrolysis and molding it merely or manufacturing an electrode by using an organic bonding agent. Moreover, the present invention improves electric conductivity, quickens charging and discharging velocity, reduces falling off of alloy powder and increases charging and discharging cycle life as internal resistance is reduced. Because copper does not have the capability of storing hydrogen and is not the active material of electrode reaction, the energy density is decreased. Therefore, it also increases the energy density by reducing the amount of copper plating.

We claim:

1. A method for manufacturing a rare earth-nickel-metallic hydride electrode, comprising the steps of molding rare earth-nickel hydrogen storage alloy powder electroless-plated with copper so as to form an electrode, and electroless-plating the molded electrode with copper, wherein the electroless-plating of the molded electrode is carried out in an acid electroless copper-plating solution.

* * * * *

UNITED STATES PATENT AND TRADEMARK OFFICE
CERTIFICATE OF CORRECTION

PATENT NO : 5,766,676
DATED : June 16, 1998
INVENTOR(S) : Park, et al.

It is certified that error appears in the above-identified patent and that said Letters Patent is hereby corrected as shown below:

Title page; item [75], please correct the spelling of the first inventor's name from "Chung Neun Park" to --Choong Nyeon Park--.

Signed and Sealed this

Eighth Day of February, 2000

*Attest:*

Q. TODD DICKINSON

*Attesting Officer*  *Commissioner of Patents and Trademarks*